(12) United States Patent
Honda et al.

(10) Patent No.: US 6,543,995 B1
(45) Date of Patent: Apr. 8, 2003

(54) STATOR VANE AND STATOR ASSEMBLY FOR A ROTARY MACHINE

(75) Inventors: Keith T. Honda, Ellington, CT (US); Michael E. McMahon, Shapleigh, ME (US); Steven J. Feigleson, Falmouth, ME (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/629,308

(22) Filed: Jul. 31, 2000

Related U.S. Application Data
(60) Provisional application No. 60/147,978, filed on Aug. 9, 1999.

(51) Int. Cl.$^7$ ................................................ F01D 1/02
(52) U.S. Cl. ............................................................ 415/189
(58) Field of Search ................................. 415/189, 190, 415/191

(56) References Cited

U.S. PATENT DOCUMENTS

| | | | |
|---|---|---|---|
| 3,428,244 A | | 2/1969 | Palmer |
| 3,867,066 A | * | 2/1975 | Canova et al. ............ 415/209.3 |
| 3,985,465 A | * | 10/1976 | Sheldon et al. .............. 415/189 |
| 3,997,280 A | * | 12/1976 | Germain ...................... 415/189 |
| 4,014,627 A | * | 3/1977 | Heurteux ..................... 415/189 |
| 4,249,859 A | * | 2/1981 | Benyi, Jr. et al. ........ 415/189 X |
| 4,820,120 A | * | 4/1989 | Feuvrier et al. ............. 415/189 |
| 5,380,152 A | | 1/1995 | Sikorski et al. |
| 6,409,472 B1 | * | 6/2002 | McMahon et al. ........... 415/119 |

FOREIGN PATENT DOCUMENTS

| | | | |
|---|---|---|---|
| FR | 2606071 | 5/1988 | |
| GB | 572859 | * 10/1945 | ................ 415/189 |
| GB | 572859 A | 10/1945 | |
| GB | 599391 A | 3/1948 | |
| GB | 702549 | * 1/1954 | ................ 415/190 |

* cited by examiner

*Primary Examiner*—Edward K. Look
*Assistant Examiner*—Igor Kershteyn
(74) *Attorney, Agent, or Firm*—Gene D. Fleischhauer

(57) ABSTRACT

A stator assembly for a rotary machine a stator vane for the assembly are disclosed. Various construction details are developed which facilitate assembly, disassembly and replaceability of the vane. The stator assembly includes a casing having a plurality of flats which adapts the case to engage a corresponding flat on the stator vane.

8 Claims, 5 Drawing Sheets

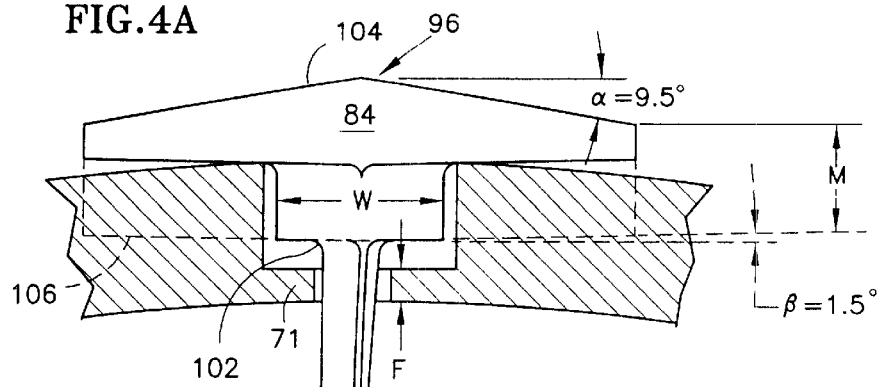
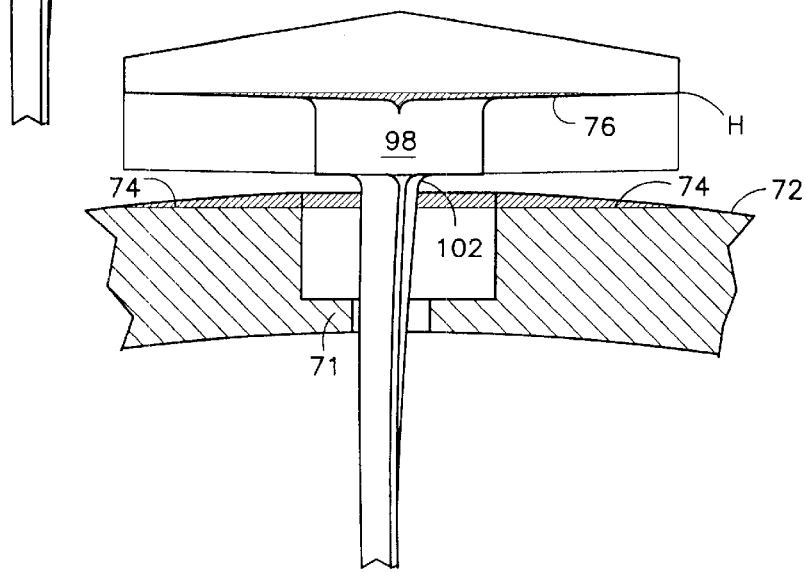
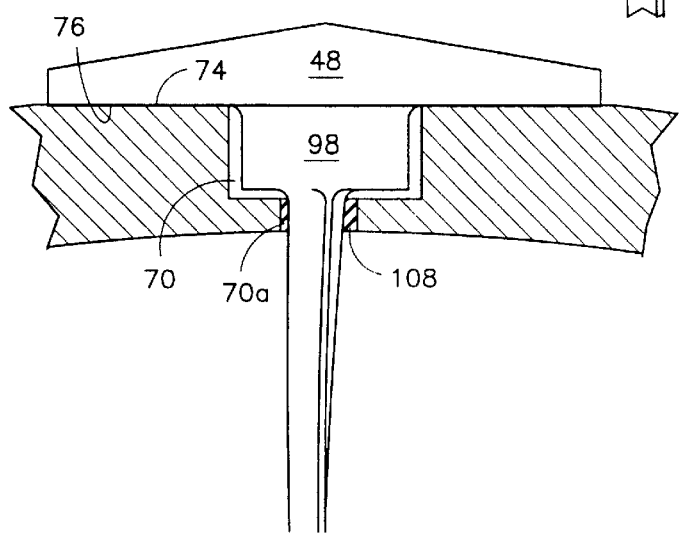

STATOR VANE AND STATOR ASSEMBLY FOR A ROTARY MACHINE

This application claims benefit from U.S. Provisional Application Ser. No. 60/147,978 filed on Aug. 9, 1999.

TECHNICAL FIELD

This invention relates to a stator structure of the type used in rotary machines, and more specifically, to structure within the compression section to guide working medium gases through the section.

BACKGROUND OF THE INVENTION

An axial flow rotary machine, such as a gas turbine engine for an aircraft, has a compression section, a combustion section, and a turbine section. An annular flow path for working medium gases extends axially through the sections of the engine. The gases are compressed in the compression section to raise their temperature and pressure. Fuel is burned with the working medium gases in the combustion section to further increase the temperature of the hot, pressurized gases. The hot, working medium gases are expanded through the turbine section to produce thrust and to extract energy as rotational work from the gases. The rotational work is transferred to the compression section to raise the pressure of the incoming gases.

The compression section and turbine section have a rotor which extends axially through the engine. The rotor is disposed about an axis of rotation Ar. The rotor includes arrays of rotor blades which transfer rotational work between the rotor and the hot working medium gases. Each rotor blade has an airfoil for this purpose which extends outwardly across the working medium flow path. The working medium gases are directed through the airfoils. The airfoils in the turbine section receive energy from the working medium gases and drive the rotor at high speeds about an axis of rotation. The airfoils in the compression section transfer this energy to the working medium gases to compress the gases as the airfoils are driven about the axis of rotation by the rotor.

The engine includes a stator disposed about the rotor. The stator has an outer case and arrays of stator vanes which extend inwardly across the working medium flowpath. The stator extends circumferentially about the working medium flow path to bound the flow path. The stator includes an outer flowpath wall (outer case) and seal elements supported from the wall for this purpose. An example is an inner shroud assembly having a circumferentially extending seal member (rubstrip). The rubstrip is disposed radially about rotating structure and may be supported, for example, by the vanes through an inner shroud. The rubstrip is in close proximity to associated knife-edge seal elements which extend circumferentially on the rotor and together form a seal that blocks the leakage of working medium gases from the flowpath.

The stator vanes and the rotor blades are designed to receive, interact with and discharge the working medium gases as the gases are flowed through the engine. The arrays of stator vanes are disposed upstream of the arrays of rotor blades in both the compression section and turbine section. The stator vanes each have an airfoil located in a predetermined manner with respect to the adjacent stator vanes for guiding the working medium gases to the rotor blades. The airfoils in the forward portion of the compression section are frequently struck by foreign objects that flow into the engine with the incoming stream of gases. These may include large foreign objects such as wild fowl or chunks of ice that may break away from adjacent structure under operative conditions. The stator vane immediately downstream of the fan blade must tolerate these impacts without tearing loose from adjacent structure and moving rearwardly into the adjacent stage of rotating rotor blades. In addition, the stator vanes are frequently replaced over the life of the engine. The replacement vanes are preferably located in a repeatable fashion such that the aerodynamic characteristics of the array of compressor vanes are maintained. Finally, seal elements such as rubstrips formed of silicone rubber which are supported by the stator vanes must tolerate severe rubs from rotating structure. Such rubs may occur during normal operative conditions of the engine or during abnormal operative conditions that might occur, for example, after an impact by a foreign object against the engine. The rubstrip must tolerate the severe rub without delaminating (a non-cohesive failure) and moving into the flow path.

The above notwithstanding, scientists and engineers working under the direction of Applicants Assignee have sought to develop stator assemblies having arrays of stator vanes that are locatable in repeatable fashion after replacement and have acceptable levels of durability and replaceability.

SUMMARY OF INVENTION

According to the present invention, a stator assembly having a plurality of vanes extending through a circumferentially extending casing and into the flowpath for working medium gases has a flat surface at each vane that engages in the installed condition an associated flat surface on a non-flow path surface of the casing.

In accordance with the present invention, the stator vane has a platform having single surfaces on either side of the airfoil which each engage a corresponding flat on the surface of the casing.

In one embodiment, the surfaces are coplanar.

In another embodiment of the present invention, a forged stator vane has a pedestal which is disposed inside the outer case which supports the stator vane and has an opening which receives the airfoil such that the airfoil extends into working medium flowpath. A silicone rubber material may be disposed between the airfoil and the vane to make a flat surface with the flowpath, and with the fillet on the pedestal being buried in the outer case.

A primary feature of the present invention is a stator vane having a flat surface which engages a casing, such as an outer case. Another feature is a casing having a plurality of flats or planar surfaces, each of which is adapted to receive an associated stator vane. Another feature is a stator vane having a pedestal of a size that permits disposing the pedestal entirely within the outer case.

A primary advantage of the present invention is the replaceablility, stability, simplicity of manufacture for a stator assembly and for its stator vanes which results from forming the stator vane with a planar surface that engages a corresponding planar surface on the circumferentially extending outer case. Another advantage is the efficiency of the engine which results from avoiding flow losses associated with vane pedestals that extend into the flowpath.

The foregoing features and advantages of the present invention will become more apparent in light of the following detailed description of the best mode for carrying out the invention and accompanying drawings.

BRIEF DESCRIPTION OF THE DRAWINGS

FIGS. 4A–4C are schematic representations of the method of forming the base of the stator vane and a cooperating flat planar surface on the outer case.

BEST MODE

Figure 1:
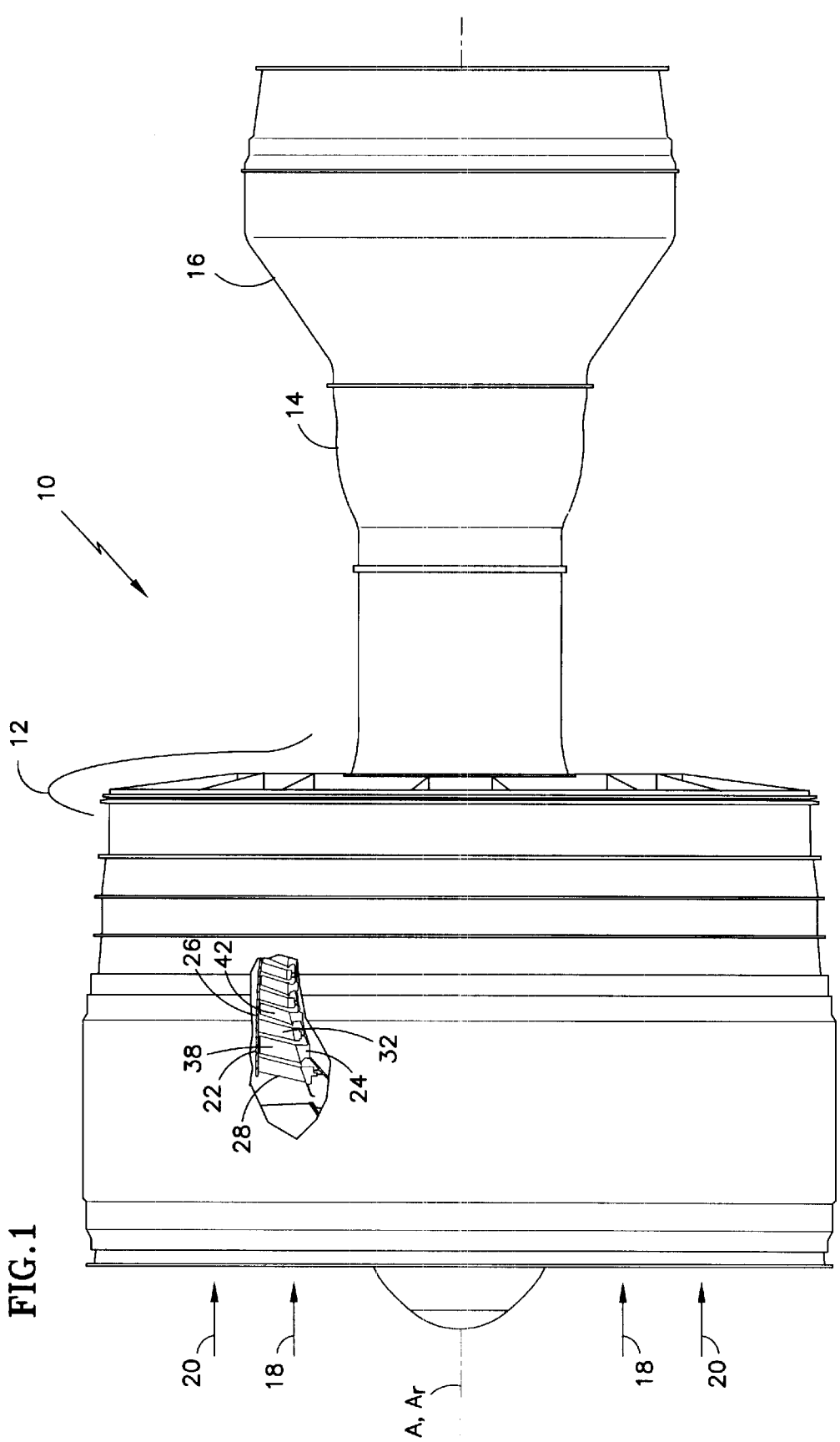
FIG. 1 is a schematic side elevation view of a gas turbine engine with portions of the engine broken away to show the compression section of the engine.

FIG. 1 is a schematic, side elevation view of a rotary machine 10, such as a turbofan gas turbine engine. The engine is disposed about an axis of symmetry A and has an axis of rotation Ar. The engine includes a compression section 12, a combustion section 14, and a turbine section 16. An annular, primary flowpath 18 for working medium gases extends axially through the sections of the engine. A by-pass flowpath 20 is outward of the primary flow path.

The engine is partially broken away to show a stator 22 and a rotor 24 in the compression section 12. The stator 22 includes an outer case 26 (flowpath wall) which extends circumferentially about the primary flowpath. The stator includes arrays of stator vanes, as represented by the stator vane 28 and the stator vane 32 in the compression section. The rotor has arrays of rotor blades, as represented by the rotor blade 38 and the rotor blade 42.

Figure 2:
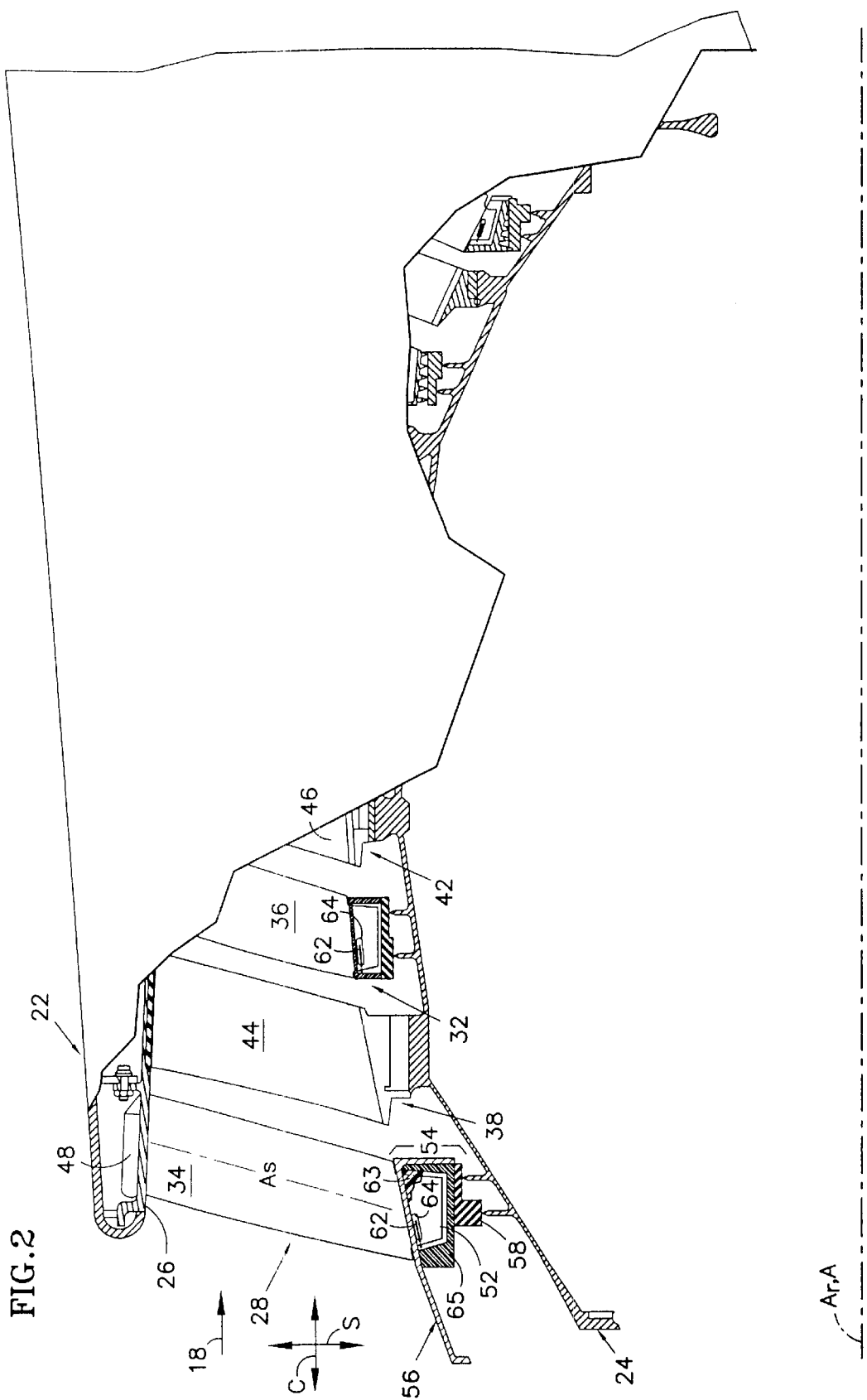
FIG. 2 is a side elevation view of a portion of the compression section shown in FIG. 1

FIG. 2 is an enlarged side elevation view of a portion of the engine shown in FIG. 1 which is partially in section and broken away for clarity. As shown in FIG. 1 and FIG. 2, each stator vane 28, 32 has an airfoil, as represented by the airfoil 34 and the airfoil 36. The airfoils extend inwardly from the outer case to direct the flow of working medium gases as the gases pass through the compression section and the turbine section.

Each rotor blade 38, 42 has an airfoil, as represented by the airfoil 44 and the airfoil 46. The rotor blade airfoils extend radially outwardly across the working medium flow path and into close proximity with the stator 22.

FIG. 2 shows the first array of stator vanes 28 extending radially inwardly from the outer case. Each vane 28 is disposed about a spanwise axis As which extends in a generally radial direction. The vane has a base 48 and a vane tip 52. The vane tip is an extension of the airfoil 34. A plurality of airfoil sections are disposed chordwisely about the spanwise axis As to define the contours of the airfoil (as used herein, plurality means an indefinite number of two or more). The airfoil has a chordwise direction C and a spanwise direction S that provide reference directions. The spanwise direction is generally perpendicular to the axis of rotation Ar.

An inner shroud assembly 54 extends circumferentially about the axis of rotation Ar and outwardly of the rotor. The inner shroud assembly might be circumferentially continuous or circumferentially segmented. The inner shroud assembly includes an inner shroud 56 and a rubstrip 58. The inner shroud is formed of aluminum. In one embodiment, the inner shroud is a circumferentially continuous ring. The rubstrip 58 is formed of an elastomeric material, such as silicone rubber.

The tip 52 of the stator vane 28 extends radially through the inner shroud 56. A clip member 62 of titanium extends circumferentially through an opening 64 in the stator vane tip 52. The clip member and tip are disposed in a potting member 63 formed of a second elastomeric material. The potting member encapsulates the tip and the clip member. The second elastomeric material might be disposed locally at each vane or extend circumferentially as a circumferentially continuous band. A bottom layer 65 of a third elastomeric material extends circumferentially to support the rubstrip.

Figure 3:
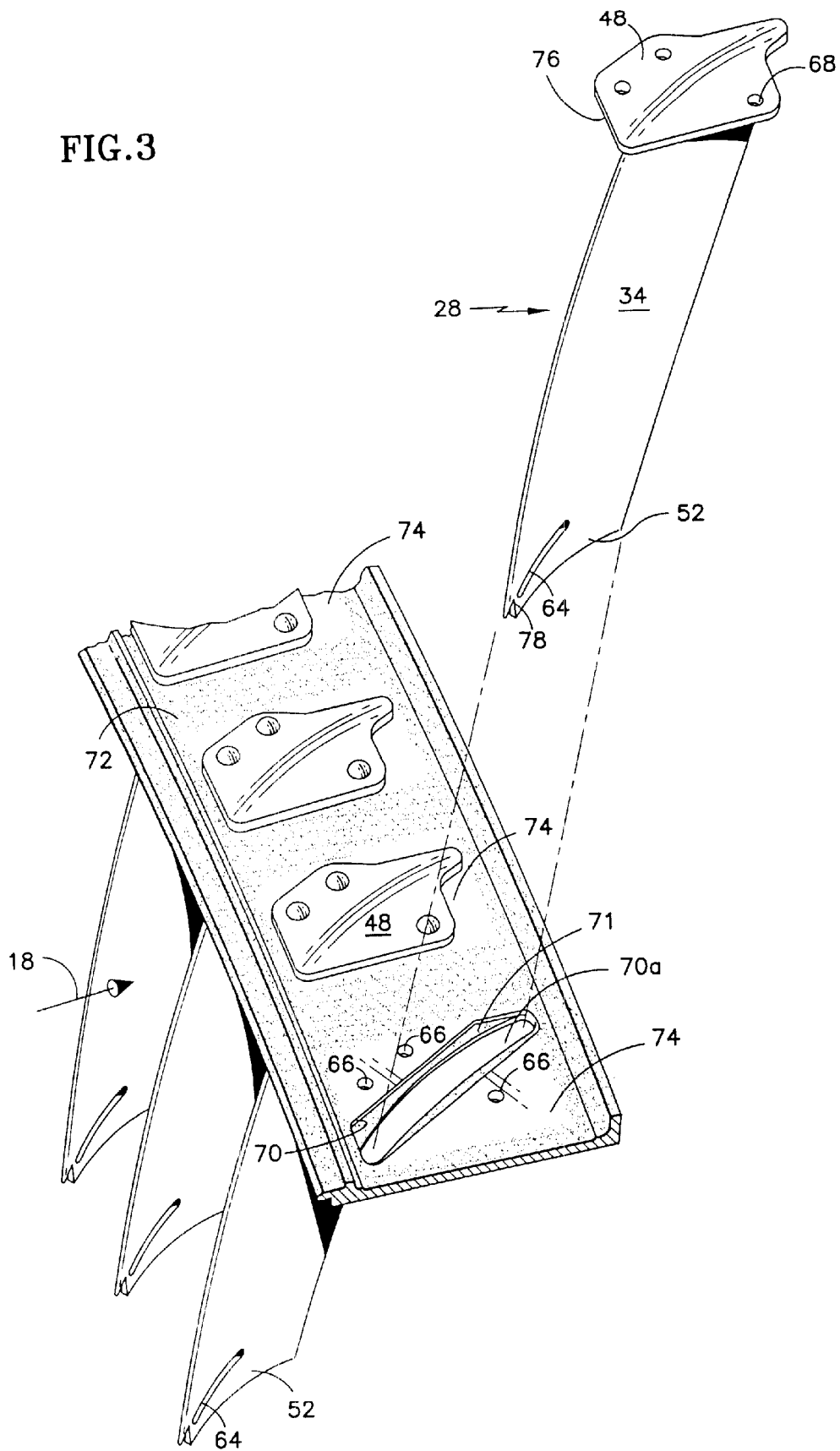
FIG. 3 is a perspective view of a stator vane from the gas turbine engine shown in FIG. 1.

FIG. 3 is a partial perspective view of the array of stator vanes 28 shown in FIG. 2. As can be seen, the outer case has a plurality of openings 66 for fasteners, as represented by the three rivet holes.

The base 48 of the stator vane 28 has three corresponding rivet holes 68, each for receiving an associated rivet formed of a copper nickel composition such as Monel material. The rivets are solid rivets and compressed and expanded to completely fill the hole and to provide a tight fit for urging the base of the vane 28 into engagement with the outer case.

The outer case has a plurality of circumferentially spaced openings, as represented by the openings 70, 70a. The opening 70 is partially countersunk or counterbored leaving a shelf 71 bounding the opening. The outer case has an outwardly facing, non-flowpath surface 72 which extends circumferentially and which presses against the base of the vane 28. One satisfactory material for the outer case is aluminum. The outwardly facing surface has a plurality of flats 74 or planar surfaces machined into the outer surface which are disposed adjacent to the opening 70. The surfaces may be circumferentially spaced or touch at a boundary. The term "flat" means plane-like within reasonable manufacturing tolerances and not curved.

The vane 28 has an inwardly facing surface 76 which mates with the outer surface on the case. The inwardly facing surface 76 on the base of the vane 28 is planar and lies in a plane at the bearing surface. The plane on the base is parallel to the plane 74 of the finished surface area. In alternate embodiments, the finished surface on the outer case might consist of two flats lying in the same plane, two flats which are angled to each other or which are parallel to each other but lie in slightly radially spaced planes. The simplest approach is to provide a single plane surface 74 or flat for the finished surface area at each of the locations on the outer case and a mating plane surface for those areas of the stator vane 28 which bear against the plane surface. The single plane surface has many advantages such as simplicity of manufacture, inspectability and ability to engage the stator vane 28.

The stator vane 28 extends radially inwardly into and across the working medium flowpath 18. The slot 64 or opening in the airfoil 46 adapts the airfoil to receive the clip member 62. The opening extends nearly to an edge of the airfoil but is spaced from the edge leaving a support strip 78 of relatively narrow material which bounds the opening.

Figure 3A:
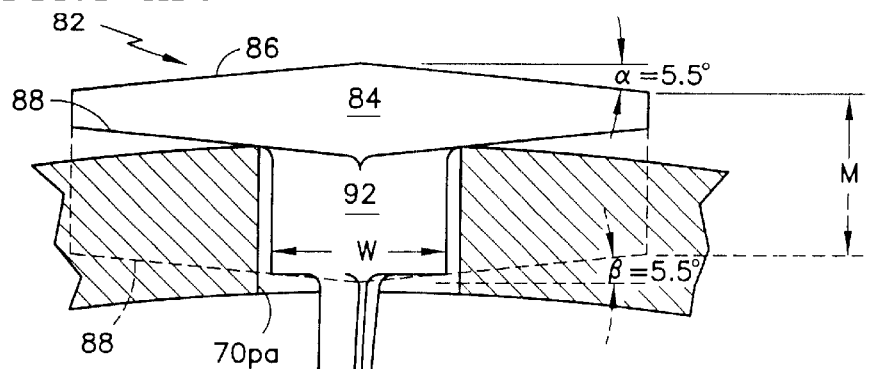
FIGS. 3A–3C are schematic representations of the method for forming the base of the stator vane shown in FIG. 2 in the prior art.

FIG. 3A shows with dotted lines a vane blank 82 fabricated as forged in the prior art. Reference numbers for the prior art construction refer to the same elements shown for the present invention, but are followed by the designation "pa." Thus, the base of the prior art construction is referred to as "48pa." The vane blank has a head 84 or precursor of the base 48pa shown in FIG. 3C. The head has an outer or outwardly facing side 86 and an inner or inwardly facing side 88. The head is shown in full with material of the head removed for comparison purposes with the present invention. As shown in full, the inner surface is parallel to the inner side 88 of the vane in the as-forged condition. The head is shown with material removed until the edge has reached the finished radial dimension.

The head 84 has a draft angle or drawing angle alpha on the outwardly facing side 86, and a draft angle beta on the inwardly facing side 88. The total included angle (summation of alpha and beta) is set for forging purposes and is eleven (11) degrees. The angles of the two surfaces shown are equal to each other and to five and one half (5 ½) degrees. The head 84 for the base 48pa is formed with a required minimum height M shown in FIG. 3A (measured between the inner and outer surface) and with these angles so that the forging can be machined and can interact in the appropriate way with the die in which the forging is formed, such as releasing from the die. The head and, after machining, the base 48pa of the finished vane 28pa have a pedestal 92 which fills the opening formed in the outer case which does not have a shelf.

Figure 3B:
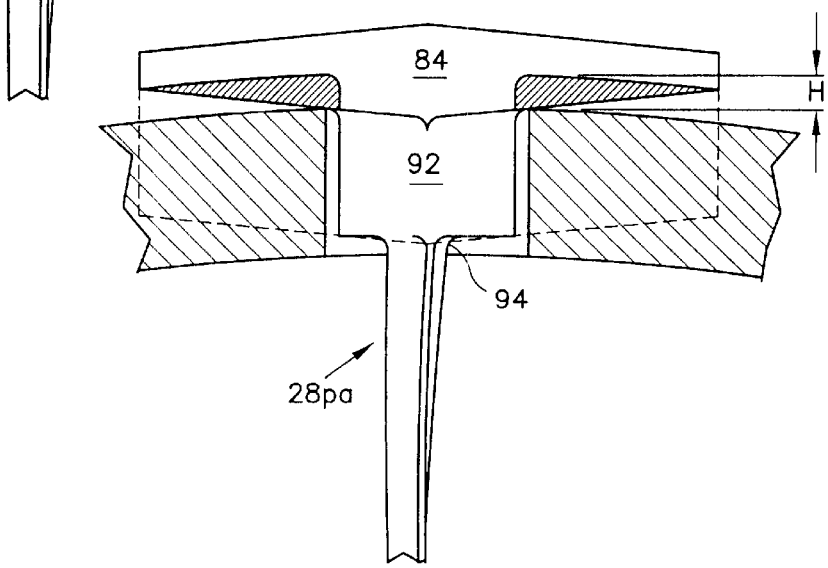

FIG. 3B shows the extent H of the material which machining will remove on the inner side for the vane blank 82 to fit the cylindrical surface of the case. The surfaces on the vane 28pa after machining are flat or curved, and are angled inwardly to press against the cylindrical surface of the outer case. The engagement is along a line of contact L. Accordingly, an advantage of the present invention as shown in FIG. 4C is the stable engagement between the flat 76 on the planar base and the surface of the outer case, now a flat 74, for locating and supporting the stator vane by having a contact in a plane rather than a line contact as shown in the prior art.

Figure 3C:
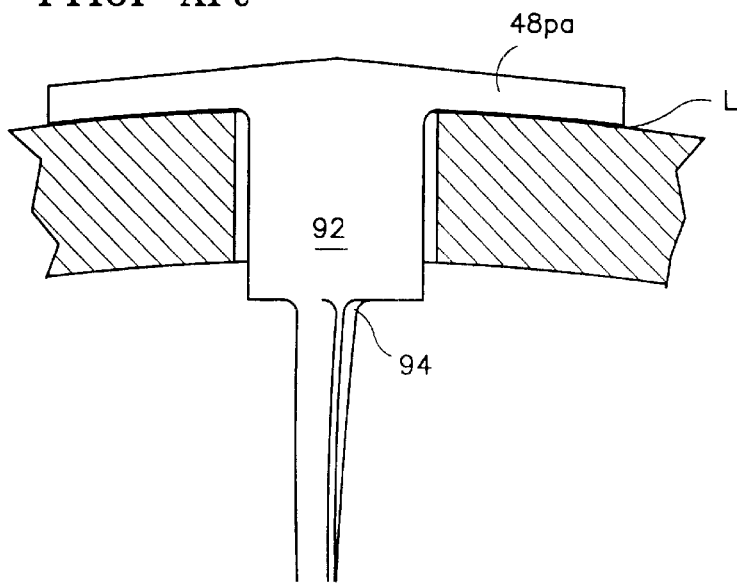

FIG. 3C shows the line contact L of the flat surface of the machined stator vane engaging the arcuate case. The rather large pedestal 92 extends radially through the case 28pa and has a large fillet 94 with a radius which now projects into the working medium flowpath 18. This fillet may cause flow disturbances. In addition, the pedestal is rather large (heavier) in comparison to the vane blank 96 which has a smaller pedestal 98 as shown in FIG. 4A.

FIG. 4A is an illustration of the present vane blank 96 as forged during the forging process. The vertical height M is smaller than the vertical height M shown in FIG. 3A for purposes of explanation. Even with the same height M, the FIG. 4A construction will have the advantages discussed herein although the height of the shelf F will be slightly reduced.

The forging is provided with a draft or draw angle of eleven (11) degrees. Accordingly, the included angle is the same as the eleven degrees shown in FIG. 3A. The angle beta on the inwardly facing surface 106 is smaller than the angle alpha on the outwardly facing side 104. The angle beta may be as little as three (3) degrees or as in the embodiment shown one and a half (1 ½) degrees. The angle alpha of the outwardly facing surface is nine and a half (9 ½) degrees. As a result, less material is removed at the inner surface from the head and the pedestal 98 is smaller.

As shown in FIG. 4B the extent H of the material for machining on the vane blank 96 is smaller on the inner side. It is also machined to a simple single flat 74 as previously discussed. The area machined on the case is also shown and it is flat (planar) turning the case from a cylindrical surface to one that has a plurality of flats 74 disposed circumferentially about the exterior of the case. In the embodiment shown, these flats are circumferentially spaced. Machining a single flat at each opening, whether the flats are spaced or contiguous, results in less machining and a better, more stable interaction between the inwardly facing surface 76 of the base 48 of the vane 28 and the outwardly facing surface 74 of the outer case. In addition, the circumferentially facing outer case is counter bored with the first opening 70 receiving the reduced volume pedestal. The pedestal 98 and its fillet radius 102 are located outwardly of the shelf 71 and are thus disposed on the interior of the case and do not project out into the working medium flowpath 18. An elastomeric material 108, such as silicone rubber or another suitable rubber, is disposed in the second opening 70a through which the airfoil extends into the working medium flowpath during assembly and under operative conditions.

Accordingly, a method of making the construction includes forming a large draft or drawing angle on the forging where the angle alpha of the outwardly facing surface is greater than the angle beta of the inwardly facing surface measured with respect to a line that is generally perpendicular to the span of the airfoil. Steps further include counterboring the circumferentially extending case such that it has a first opening 70 for receiving the pedestal and a second opening 70a for passing the vane 28 into the working medium flowpath. In addition, three rivet holes are formed in the case to retain the stator vane. Because of the flat surface to flat surface contact between the inwardly facing surface of the stator vane and the outwardly facing surface of the case, good contact and alignment of the stator vane 28 with adjacent stator vanes occurs even with only three rivets. Moreover, if a stator vane 28 is replaced, the replacement stator vane has planar contact which is not markedly disturbed by tolerance variations as would a flat surface engaging a cylindrical surface. Instead, the tolerance variations on the surface of the stator vane interact with a flat surface, providing for more stable engagement.

Although the invention has been shown and described with respect to detailed embodiments thereof, it should be understood by those of ordinary skill that various changes in form and in detail thereof may be made without departing from the spirit and scope of the claimed invention.

We claim:

1. A stator assembly for a rotary machine having an axis A, and having a plurality of stator vanes extending inwardly across a working medium flowpath, the stator vanes extending inwardly through a circumferentially extending case and into the flowpath for working medium gases, which comprises:

a case which extends circumferentially about the flowpath, which has a non-flowpath surface facing outwardly and which has a plurality of openings for receiving stator vanes, the case having a flat on the non-flowpath surface of the case at each opening which adapts the case to engage a corresponding stator vane;

a plurality of stator vanes, each of which has a base which is attached to the outer case and which has a flat surface at each vane that engages the associated flat surface on the nonflow path surface of the case, each stator vane having an airfoil extending spanwise inwardly from the base and wherein the case has an opening which receives the airfoil such that the airfoil extends into the working medium flowpath and wherein the stator vane has a pedestal which transitions from the base to the airfoil and which is disposed inside the opening in the outer case such that the airfoil extends through a portion of the case.

2. The stator assembly as claimed in claim 1 wherein the stator vane has an airfoil and a platform from which the airfoil extends, the platform having a flat surface on either side of the airfoil which each engage the corresponding portion of a flat on the surface of the casing.

3. The stator assembly as claimed in claim 2 wherein the surfaces are coplanar.

4. The stator assembly as claimed in claim 1 wherein a silicone rubber material is disposed between the airfoil and the case to make a flat surface on the flowpath surface of the case adjacent the flowpath.

5. A stator assembly for a rotary machine having an axis A, and having a plurality of stator vanes extending inwardly across a working medium flowpath, the stator vanes extending inwardly through a circumferentially extending case and into the flowpath for working medium gases, which comprises:

a case which extends circumferentially about the flowpath which has a non-flowpath surface facing outwardly and which has a plurality of openings for receiving stator vanes, the case having a flat on the non-flowpath surface of the case at each opening which adapts the case to engage a corresponding stator vane;

a plurality of stator vanes, each of which has a base having a flat surface at each vane that engages the associated flat surface on the nonflow path surface of the case, each stator vane having an airfoil extending spanwise inwardly from the base and through the opening which receives the airfoil such that the airfoil extends into working medium flowpath;

wherein the stator vane has a pedestal which transitions from the base to the airfoil and which is disposed inside the opening in the outer case, wherein the stator vane has a fillet which extends between the airfoil and the pedestal, and wherein the fillet on the pedestal is buried in the opening through the outer case.

6. The stator assembly as claimed in claim 5 wherein the opening includes a first opening which is counter sunk in the case leaving a shelf of the case between the first opening and the flowpath, and a second opening which extends from the first opening and is bounded by the shelf and through which the airfoil extends.

7. A stator vane for a rotary machine having an outer case which has an opening which is adapted to receive the airfoil such that the airfoil extends through the case, the stator vane being adapted to engage the outer case, the stator vane having an airfoil, the stator vane having a base which has at least one surface facing toward the airfoil which adapts the stator vane to engage the outer case and which is adapted to be attached to the outer case and wherein each part of said at least one surface is not angled toward any other part of said at least one surface and wherein the stator vane has a pedestal which transitions from the base to the airfoil and which pedestal is adapted to be disposed entirely inside said opening in the outer case such that the airfoil extends through a portion of the case.

8. The stator vane as claimed in claim 7 wherein all of said at least one surface lies within a single plane.

* * * * *